US008948298B2

United States Patent
Lee et al.

(10) Patent No.: US 8,948,298 B2
(45) Date of Patent: Feb. 3, 2015

(54) MIMO SYSTEM AND METHOD OF GENERATING HIERARCHICAL CODEBOOK THEREFOR

(75) Inventors: Jung Woo Lee, Seoul (KR); Kyeong Jun Ko, Seoul (KR); Sung Kyu Jung, Seoul (KR)

(73) Assignee: Seoul National University Industry Foundation, Seoul (KR)

( * ) Notice: Subject to any disclaimer, the term of this patent is extended or adjusted under 35 U.S.C. 154(b) by 0 days.

(21) Appl. No.: 13/411,543

(22) Filed: Mar. 3, 2012

(65) Prior Publication Data

US 2013/0215987 A1  Aug. 22, 2013

(30) Foreign Application Priority Data

Feb. 16, 2012  (KR) ........................ 10-2012-0015704

(51) Int. Cl.
*H04K 1/02*  (2006.01)
*H04L 25/03*  (2006.01)
*H04L 25/49*  (2006.01)

(52) U.S. Cl.
USPC ........... 375/296; 375/267; 375/262; 375/260; 370/335; 704/238

(58) Field of Classification Search
CPC ...................... G11C 2029/1208; H04B 1/7075; H04B 7/0639; H04B 7/0478
USPC .................. 375/296, 267, 262, 260; 370/335; 704/238
See application file for complete search history.

(56) References Cited

U.S. PATENT DOCUMENTS

| 2004/0221192 A1* | 11/2004 | Motta et al. ........................ 714/8 |
| 2006/0161432 A1* | 7/2006 | Zhang et al. ................... 704/238 |
| 2008/0037675 A1* | 2/2008 | Lin et al. ........................ 375/262 |
| 2010/0054212 A1* | 3/2010 | Tang .............................. 370/335 |
| 2010/0150266 A1* | 6/2010 | Mondal et al. ................. 375/296 |

OTHER PUBLICATIONS

Shu et al. (Fang Shu et al., "Multi-User MIMO Linear Precoding with Grassmannian Codebook", 2009, IEEE, total of 6 pages).*

* cited by examiner

*Primary Examiner* — Sam K Ahn
*Assistant Examiner* — Fabricio R Murillo Garcia
(74) *Attorney, Agent, or Firm* — William Park & Associates Patent Ltd.

(57) ABSTRACT

Disclosed is a multiple-input multiple-output (MIMO) system including a transmitting end and a receiving end, wherein the transmitting end includes: a hierarchical codebook in which at least one base codebook is designated as the upper matrix and a child codebook generated based on a chordal distance between respective codewords configuring the base codebook is designated as the lower matrix; a scheduler configured to receive channel state information from the receiving end and select precoding matrices from the hierarchical codebook based on the channel state information; and a precoder configured to apply the precoding matrices selected in the scheduler to data to be transmitted to the receiving end and transmit the selected precoding matrices through a plurality of antennas.

11 Claims, 7 Drawing Sheets

MIMO SYSTEM AND METHOD OF GENERATING HIERARCHICAL CODEBOOK THEREFOR

CROSS-REFERENCES TO RELATED APPLICATION

The present application claims priority under 35 U.S.C. §119(a) to Korean application number 10-2012-0015704, filed on Feb. 16, 2013, in the Korean Intellectual Property Office, which is incorporated herein by reference in its entirety as set forth in full.

BACKGROUND

1. Technical Field

Exemplary embodiments of the present invention relate to a wireless communication technology, and more particularly, to a multiple-input multiple-output (MIMO) system and a method of is generating a hierarchical codebook therefor.

2. Related Art

An example of methods for increasing data transmission efficiency in a wireless communication system may include a multiple-input multiple-output (MIMO) scheme. The MIMO scheme may be classified into a single-user MIMO (SU-MIMO) scheme and multiuser MIMO (MU-MIMO) scheme according to whether data transmission is enabled using the same resources when data are transmitted to each user.

Further, the MU-MIMO system may be classified into an open loop type in which a transmitting end performs communication without considering a channel state and a closed loop type in which a transmitting end performs communication by referring to channel information fedback from a receiving end. However, the closed loop type approaching theoretical transmission capacity by applying an independent modulation and coding scheme to each transmit antenna according to a channel state has been mainly used.

In the closed loop type MU-MIMO system, the channel information is used to improve performance of the entire system and channel state information (CSI) needs to be fedback from a receiving end to a transmitting end so as to acquire the channel information at the transmitting end.

Generally, a codebook is used to transmit the channel state information from the receiving end to the transmitting end. Each codeword configuring the codebook represents different channel is states for channels formed between the transmitting end and the receiving end. In particular, a frequency division duplex (FDD) system needs to accurately feedback the channel state information.

In the system using the limited feedback information, the receiving end estimates its own channel state information and searches a codeword approximating the channel information state estimated by a predefined distance measuring scheme. Further, an index of the searched codeword is fedback to the transmitting end.

An example of representative example of the codebook may include a Grassmannian codebook. The Grassmannian codebook has been known as being optimized for a independent identically distributed (i.i.d) channel, which leads to degraded performance in a spatially correlated channel.

Another representative example for generating the codebook may include a codebook based on discrete Fourier transform (DFT), which may be applied to both of the i.i.d. channel and the spatially correlated channel. However, the DFT based codebook increases calculation complexity and degrades efficiency as a size of the codebook is increased.

The DFT based codebook and the existing codebooks may reduce quantization errors as the size of the codebook is increased but may exponentially increase the calculation complexity for searching the codeword according to the size of the codebook. To this end, a scheme for hierarchically configuring the codebook has been researched and the DFT based codebook is also designed as the is hierarchical codebook. However, the hierarchical codebook proposed until now is for the multi-user MIMO system and therefore, can be hardly applied to the single-user MIMO system.

SUMMARY

In one embodiment of the present invention, a multiple-input multiple-output (MIMO) system includes: a transmitting end and a receiving end, wherein the transmitting end includes: a hierarchical codebook in which at least one base codebook is designated as the upper matrix and a child codebook generated based on a chordal distance between respective codewords configuring the base codebook is designated as the lower matrix; a scheduler configured to receive channel state information from the receiving end and select precoding matrices from the hierarchical codebook based on the channel state information; and a precoder configured to apply the precoding matrices selected in the scheduler to data to be transmitted to the receiving end and transmit the selected precoding matrices through a plurality of antennas.

In another embodiment of the present invention, a method for generating a hierarchical codebook for a multiple-input multiple-output (MIMO) system includes: setting at least one base codebook as an upper matrix; calculating a chordal distance between respective codewords configuring the base codebook; and selecting the designated number of codewords for each codeword included in the base codebook based on the calculated chordal distance to set a child codebook and setting the child codebook as a lower matrix.

When the channel between the transmitting end and the receiving end may be an independent identically distributed channel, the setting of the child codebook may include: selecting a reference codeword and the designated number of candidate codewords having a close chordal distance by using each codeword included in the single base codebook as the reference codeword; calculating a primary centroid vector of the reference codeword and the candidate codeword; and calculating a secondary centroid vector of the reference codeword and the primary centroid vector and setting the secondary centroid vector as the codeword of the child codebook.

When the channel between the transmitting end and the receiving end is an independent identically distributed channel, the calculating of the chordal distance may calculate a chordal distance between a first base codeword included in a first base codebook and a second codebook included in a second base codebook for two first base codebooks and two second base codebooks (a size of the first base codebook<a size of the second base codebook) having different sizes, and the setting of the child codebook may select the first base codeword having the closest chordal distance based on the second base codeword.

The method for generating a hierarchical codebook for a multiple-input multiple-output (MIMO) system may further include: setting the first base codeword as the codeword of the child codebook when there is no first base codeword having the closest chordal is distance based on the second base codeword.

When the channel between the transmitting end and the receiving end is an independent identically distributed channel, the setting of the child codebook may include: selecting a reference codeword and the designated number of candidate codewords having a close chordal distance by using each codeword included in the single base codebook as the reference codeword; calculating a primary centroid vector of the reference codeword and the candidate codeword; calculating a secondary centroid vector of the reference codeword and the primary centroid vector; calculating a secondary centroid vector of the reference codeword and the primary centroid vector; calculating a third order centroid vector of the candidate codeword and the primary centroid vector; and setting the secondary centroid vector and the third order centroid vector as the codeword of the child codebook.

As the base codebook, a Grassmannian codebook may be used and the chordal distance and the centroid vector may be calculated based on an LBG algorithm but is not limited thereto.

BRIEF DESCRIPTION OF THE DRAWINGS

Features, aspects, and embodiments are described in conjunction with the attached drawings, in which.

DETAILED DESCRIPTION

Hereinafter, a semiconductor memory apparatus and a test circuit therefor in accordance with the present invention will be described below with reference to the accompanying drawings through exemplary embodiments.

Figure 1:
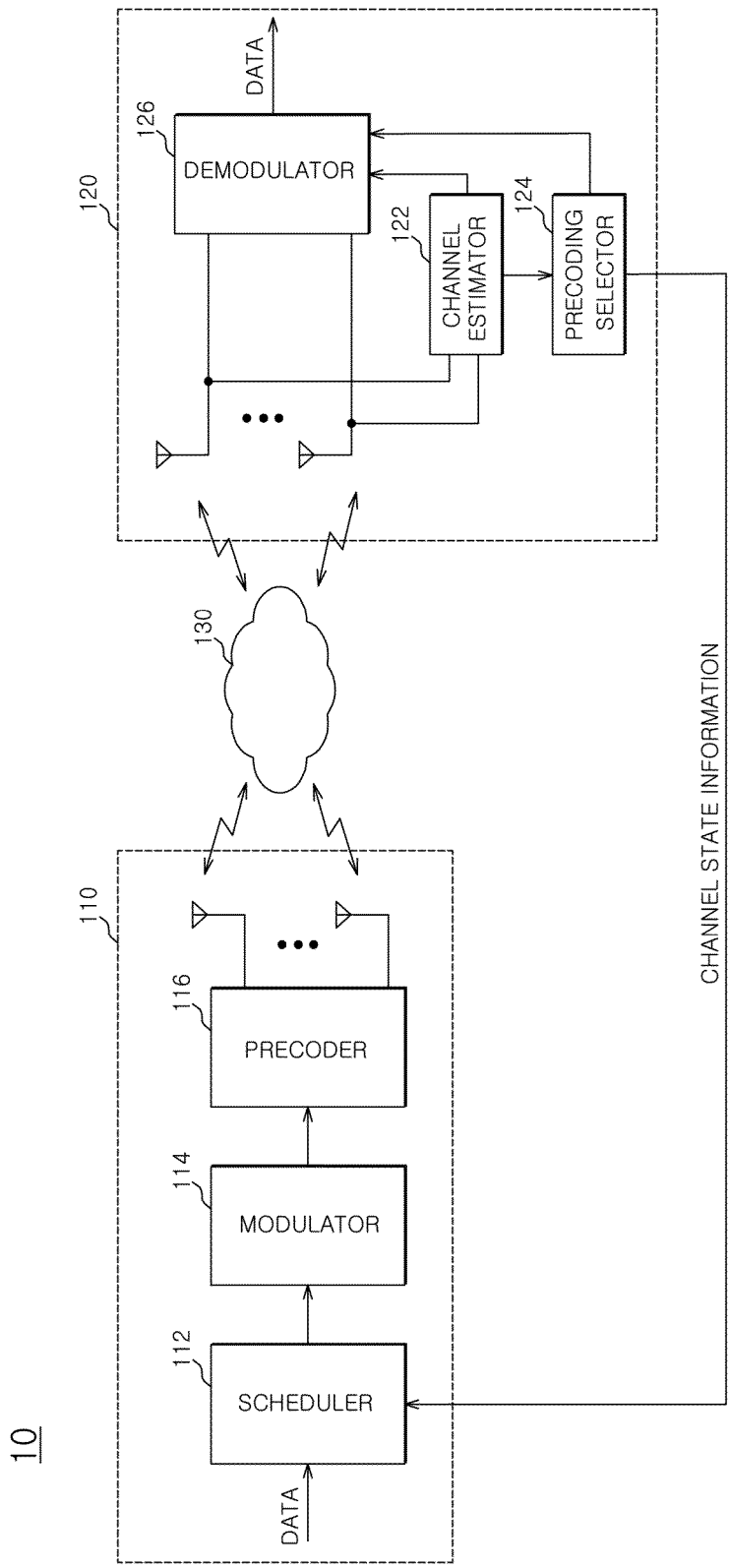
FIG. 1 is a configuration diagram of an MIMO system in accordance with an embodiment of the present invention.

FIG. 1 is a configuration diagram of an MIMO system in accordance with an embodiment of the present invention, which may be, for example, a single-user MIMO (SU-MIMO) system.

As illustrated in FIG. 1, an MIMO system 10 in accordance with an embodiment of the present invention is configured to include a transmitting end 110 and a receiving end 120.

First, the transmitting end 110 may include a scheduler 112, a modulator 114, and a precoder 116.

The scheduler 112 selects precoding matrices based on feedback information received from the receiving end 120 and schedules data to be transmitted to the receiving end 120. To this end, the scheduler 112 may store a preset codebook. The codebook may be a hierarchical codebook in which at least one base codebook is designated as the upper matrix and the child codebook generated based on the chordal distance between respective codewords configuring the base codebook is designated as the lower matrix.

The modulator 114 modulates data to be transmitted to the receiving end 120 and the precoder 116 precodes the modulated data and is transmitted the precoded data to a communication network 130 through a plurality of antennas. As an example, the data to be transmitted to the receiving end 120 may be provided in parallel and is the precoder 116 may perform the precoding in a manner that the precoding matrices are applied to the data converted in parallel. Here, the precoding matrices may be acquired through channel state information, that is, precoding matrix indexes that are feedback from the receiving end 120.

Meanwhile, the receiving end 120 may be configured to include a channel estimator 122, a precoding selector 124, and a demodulator 126.

The channel estimator 122 estimates channels from received signals through the plurality of antennas. For example, each channel may estimate using a pilot signal received from the transmitting end.

The precoding selector 124 selects the precoding matrices based on the channel information estimated in the channel estimator 122 and feedbacks the index corresponding thereto to the transmitting end 110. To this end, the precoding selector 124 selects the precoding matrices having the largest data transmission rate for all the precoding matrices included in the prestored codebook based on the estimated channel information and feedbacks the indexes corresponding thereto to the transmitting end 110. In the embodiment of the present invention, the precoding selector 124 of the receiving end 120 shares the same codebook as the transmitting end 110. The codebook may be a hierarchical codebook in which at least one base codebook is designated as an upper matrix and a child codebook generated based on a chordal distance between respective is codewords configuring the base codebook is designated as a lower matrix.

The demodulator 126 uses the channel information estimated in the channel estimator 122 and the precoding matrices selected in the precoding selector 124 to detect and demodulate the data received through the plurality of antennas.

In order to improve the system performance, a large codebook is required, which leads to the exponential increases in complexity for codeword search. Therefore, the embodiment of the present invention designates at least one base codebook as the upper matrix and generates the child codebook based on the chordal distance from the upper matrix. In particular, when generating the child codebook, the child codebook is configured in an order of the closest chordal distance from each codeword included in the upper matrix based on the chordal distance rather than including all the candidates and is determined as the lower matrix, which leads to the reduction in the size of the codebook.

Since the codeword is selected based on the chordal distance, the quantization errors may be maintained at a level similar to the related art. Further, the size of the lower matrix may be minimized and therefore, the system complexity may be remarkably reduced.

Figure 2:
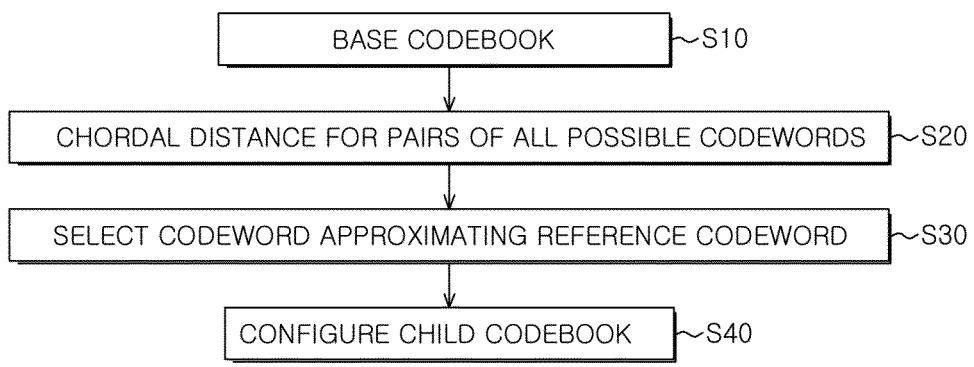
FIG. 2 is a diagram for describing a concept of generating a is hierarchical codebook in accordance with an embodiment of the present invention.

FIG. 2 is a diagram for describing a concept of generating a hierarchical codebook in accordance with the embodiment of the present invention.

In the embodiment of the present invention, in order to configure the hierarchical codebook, at least one base codebook is prepared (S10).

Further, for each codebook configuring the base codebook, the chordal distance for all the possible pairs is calculated based on each codeword (S20).

When the chordal distance is calculated, it is aligned according to a size and the designated number of codewords having a close chordal distance is selected from a reference codeword (S30).

Further, the child codebook is configured based on the selected codeword (S40).

The base codebook is designated as the upper matrix of the precoding matrices that is used in the MIMO system in accordance with the embodiment of the present invention and the child codebook is designated as the lower matrix. This is used as a common at the transmitting end and the receiving end.

In the embodiment of the present invention, the base codebook may be a Grassmannian codebook, which is used as the upper matrix in the real system.

The Grassmannian codebook has a structure for maximizing a minimum distance between the codewords in the codebook. Grassmannian line packing is implemented by optimizing a one-dimensional sub-space in a high-dimensional space. In this case, each line needs to be arrayed farthest away from an m-dimensional complex space $\mathbb{C}^m$. A Grassmannian space G (m, n) is a set of n-dimensional sub-spaces of the $\mathbb{C}^m$.

In a space of a unit-norm transmitting beam forming vector $\Omega_m$, $w_1 \in \Omega_m$ and $w_2 \in \Omega_m$. In this case, a distance between two lines considering the unit vectors $w_1$ and $w_2$ is defined by a sine value of an angle ($\theta_{1,2}$) between two lines. The distance is represented by Equation 1.

$$d(w_1, w_2) = \sin(\theta_{1,2}) = \sqrt{1 - |w_1^H w_2|^2}. \quad \text{[Equation 1]}$$

In G (m, 1), L lines may be represented by m×L matrix $W = [w_1, w_2, \ldots, w_L]$. Where $w_i$ is a vector belonging to $\Omega_m$ and a column space thereof is an i-th line within the packing. When the single matrix is L≤m, an optimal line packing solution is provided and therefore, a case of L>m may be considered. The minimum distance of the packing is a sine value having a minimum angle between any one pair of lines and is represented as follows.

$$\delta(W) = \min_{1 \leq k \leq l \leq L} \sqrt{1 - |w_k^H w_l|^2} = \sin(\theta_{min}) \quad \text{[Equation 2]}$$

Where $\theta_{min}$ is a minimum angle between any one pair of lines within the packing. Therefore, the Grassmannian codebook is designed as follows.

$$W = \arg\max_{X \in u_L^m} \delta(X) \quad \text{[Equation 3]}$$

Where $U_L^m$ is a set of L unit vectors in the G (m, 1).

However, the Grassmannian codebook is proposed for only the beam forming system, which is not appropriately applied to the MIMO environment having the limited feedback.

Therefore, the Grassmannian codebook used as the base codebook needs to be re-represented for the MIMO system having the limited feedback and uses the chordal distance therefor.

Meanwhile, Linde, Buzo, and Gray LBG algorithms are algorithms that generate the optimal codebook by a repetitive method according to a nearest neighbor condition and a centroid condition from a training vector several tens of times larger than the codebook. This is the vector quantization technology based on a Lloyd algorithm, which is referred to as a vector quantization technology based on a generalized Lloyd algorithm (GLA). The Lloyd algorithm is a partial optimization technology for scalar quantization. In the embodiment of the present invention, a centroid condition of the LBG algorithm is used to design the hierarchical codebook.

The codebook based on the LBG algorithm is designed by the centroid condition and the nearest neighbor (NN) condition for a training sequence that is generated by probability distribution of the channel. However, the LBG algorithm uses an Euclidean distance (mean-squared error) for measuring a distance. In this case, this distance is not appropriate for a communication system that does not consider the mean-squared error and therefore, needs to be optimized for the wireless communication system.

The NN condition is to search an optimized subset for the given codebook and is represented as follows. The nearest neighbor condition may be represented by [Equation 4].

$$R_n = \{X: d_c(X, C_n) < d_c(X, C_{n'}), \forall n' \neq n\} \quad \text{[Equation 4]}$$

Where X represents a channel sample (vector or matrix) from a training set, $C_n$ represents an n-th codeword, and $R_n$ represents a region re-represented by the $C_n$. $d_c(\ )$, which represents the chordal distance, is widely used for a measuring method of representing a distance between the spaces. The chordal distance between spaces A and B is represented as follows.

$$d_c(A, B) = \frac{1}{\sqrt{2}} \| A_o A_o^H - B_o B_o^H \|_F \quad \text{[Equation 5]}$$

Where $A_o$ and $B_o$ are an orthogonal base based on subspaces A and B.

The centroid condition in the LBG algorithm is for searching the optimal codeword for the given subset and is as follows.

$$C_n = U_R I_{M \times N} \quad \text{[Equation 6]}$$

Where M and N each are the number of transmit antennas and receive antennas and $U_R$ is a unit unique vector matrix in eigen decomposition of a sampling covariance matrix R. The sampling covariance matrix is represented as follows.

$$R = \frac{1}{|R_n|} \sum_{X_m \in R_n} X_m X_m^H \quad \text{[Equation 7]}$$

Where $X_m$ is a training sample.

The centroid condition minimizes a mean distance in the $R_n$ acquired by the NN condition to update the codebook. The centroid condition is acquired by the following Equation 8.

$$\begin{aligned} C_n &= \arg\min_C \frac{1}{|R_n|} \sum_{X_m \in R_n} d_c^2(X_m, C) \\ &= \arg\min_C \frac{1}{|R_n|} \sum_{X_m \in R_n} tr(I_N - C^H X_m X_m^H C) \\ &= \arg\max_C tr(C^H R C) \\ &= U_R I_{M \times N}. \end{aligned} \quad \text{[Equation 8]}$$

Where C is a codebook set configuring $C_n (1 \leq n \leq 2^B)$ and B is the number of feedback bits.

In summary, $R_n$ is determined by the NN condition together with the initial codebook and the initial training sequence and a new codebook is updated by applying the centroid condition in the $R_n$. The process is repeated until mean distortion is a threshold given below.

The embodiment of the present invention selects the codewords having a close chordal distance from a reference codeword based on the chordal distance and configures the child codebook, that is, the lower matrix based on the selected codewords.

For the i.i.d. channel, the base codebook may be prepared is as the single Grassmannian codebook, the chordal distance for each codeword may be calculated, and the designated number of close codewords for each codeword is selected. Further, the child codebook is configured using the centroid condition for the selected codeword and the reference codeword.

As another example for generating the hierarchical codebook for the i.i.d channel, two Grassmannian codebooks may be used as the base codebook, that is, the upper codebook. In order to configure the child codebook, the chordal distance between the codewords included in the first base codebook and the second base codebook, respectively, is calculated. The size of the second base codebook may be larger than that of the first base codebook, the designated number of close codewords (included in the first base codebook) for each codeword configuring the second base codebook is selected, the child codebook is configured using the selected codewords.

For the temporally correlated channel, the base codebook may use the single Grassmannian codebook. Further, the chordal distance for each codeword is calculated and the designated number is of close codewords for each codeword is selected. Further, the candidate codewords are selected by the centroid condition for the selected codeword and the reference codeword and the child codebook is configured by the centroid condition for the candidate codewords.

The method of generating a hierarchical codebook in accordance with various embodiments of the present invention will now be described with reference to FIGS. 3 to 8. All the embodiments of the present invention have common characteristics in that the base codebook is used as the upper matrix and the child codebook, that is, the lower matrix is configured using the chordal distance between the codewords from the base codebook.

Figure 3:
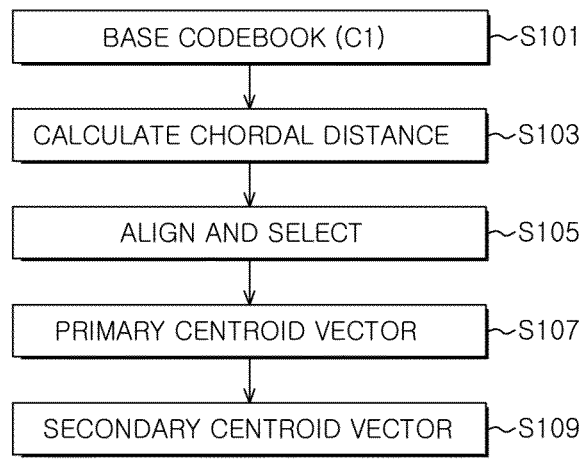
FIG. 3 is a flow chart for describing a method of generating a hierarchical codebook in accordance with a first embodiment of the present invention.

FIG. 3 is a flow chart for describing the method of generating a hierarchical codebook in accordance with the first embodiment of the present invention and illustrates an example of the method of generating a hierarchical codebook for the i.i.d. channel.

First, for convenience of explanation, a simple system model having a single transmitting end and a single receiving end is considered. When it is assumed that the receiving end may completely estimate its own channel for a block fading channel, a system model is as follows.

$$y = \sqrt{P} H^H V s + n \qquad \text{[Equation 9]}$$

Where P represents transmission power, H represents an M×N channel matrix in which a channel entry is i.i.d. complex Gaussian having zero average and unit dispersion, V represents an M×N precoding matrix, s represents a transmission symbol, and n represents an N×1 complex white Gaussian noise vector having the zero average and unit dispersion.

The centroid condition minimizes the mean distortion (distance) represented by Equation 8. Two subspaces A1 and A2 that may be a vector or a matrix are considered. In this case, the centroid between $A_1$ and $A_2$ may be represented by $A_3$. The chordal distance between $A_1$ and $A_3$ is equal to the chordal distance between $A_2$ and $A_3$ since $A_3$ is a centroid.

Basically, a method of designing a hierarchical codebook in accordance with the first embodiment of the present invention for the i.i.d. channel uses as the base codebook the Grassmannian codebook in which the codewords are located spatially farthest away from each other, as compared with codewords of another codebook. At the time of generating the child codebook, the chordal distance and the centroid condition of the LBG algorithm are used.

Referring to FIG. 3, the method of generating a codebook in accordance with the embodiment of the present invention includes preparing the base codebook $C_1$. The base codebook ($C_1 = \{v_1, v_2, \ldots, v_2B_1\}$) may be the Grassmannian codebook and the size $2^{B_1}$, $v_i$ thereof are an i-th vector (or matrix) codeword.

When the base codebook is prepared, the chordal distance between $v_i$ and $v_j (1 \le i \le 2^{B_1}, 1 \le j \le 2^{B_1}, j \ne i)$ is calculated for i-th and j-th vectors (or matrices) (S103).

Further, the chordal distance is aligned according to the size based on $v_i$ to select the designated number, for example, $2^{B_2}$ codewords having the close chordal distance from $v_i$ (S105). The selected $2^{B_2}$ codewords may be defined by $n_{i,k}$ ($1 \le k \le 2^{B_2}$). Further, $2^{B_1}$ is larger than $2^{B_2}$.

After $n_{i,k} (1 \le k \le 2^{B_2})$ is defined, the centroid vector between $v_i$ and $n_{i,k}$ for all the i and k is a primary centroid vector, which is defined by $a_{i,k}$ (S107).

Next, for all the i and k, the centroid vector between $v_i$ and $a_i$, k is calculated as a secondary centroid vector and the secondary centroid vector is configured as a new child codebook for $v_i$ (S109).

Figure 4:
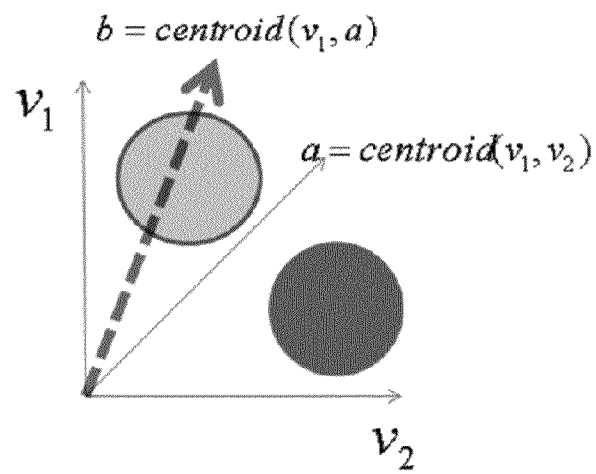
FIG. 4 is a conceptual diagram of a method of generating a hierarchical codebook in accordance with the first embodiment of the present invention.

FIG. 4 is a conceptual diagram of the method of generating a hierarchical codebook in accordance with the first embodiment of the present invention.

Based on $v_1$, it is assumed that one of $2^{B_2}$ codewords selected at S105 is, for example, $v_2$. In this case, the primary centroid vector $a_{1,2}$ between $v_1$ and $v_2$ calculated by S107 is represented by a=centroid ($v_1$, $v_2$) in FIG. 4. Further, the secondary centroid vector between $v_1$ and $a_{1,2}$ (=centroid ($v_1$, $v_2$)) that are calculated by S109 is represented by b=centroid ($v_1$, a).

The codebook generated in accordance with the embodiment of the present invention that is described in FIGS. 3 and 4 has characteristics in that the new child codebook is regenerated from the codebook that is present in advance.

For using the codebook generated as illustrated in FIG. 3, the receiving end first estimates its own channel and obtains the optimal codeword within items of the chordal distance in the base codebook $C_1$, that is, the upper matrix. The optimal codeword within the upper matrix is defined by $v_i^*$. After $v_i^*$ is selected within the upper matrix, the receiving end selects the optimal codeword within the child codebook, that is, the lower matrix $S_i^*$. Where the child codebook for $v_i$ is defined by $S_i = \{c_{i,1}, c_{i,2}, \ldots, c_{i,2}B_2\}$. The optimal codeword from $S_{i^*}$ is defined by $c_{i^*,j^*}$. This becomes the finally selected codeword. The indexes of i* and j* are now fedback to the transmitting end.

For example, the limited feedback system in which B1=4 and B2=2 is considered. $C_1$ is a 4 bit Grassmannian codebook and the child codebook generated by $C_1$ is configured to have four codewords for each $v_i (1 \le i \le 2^{B_1})$. If the codeword selected at $C_1$ is v10, i*=10, the final codeword is selected from $S_{10}$. If the final codeword is $C_{10,3}$, the index for $B_1$ is 10 and the index 3 for $B_2$ is fedback to the transmitting end. A total number of feedback is bits becomes $B = B_1 + B_2 = 6$.

In order to configure the child codebook, there is a need to calculate the chordal distance between combinations of all the possible codewords. Further, the most approximating $2^{B_2}$ codewords for $v_i$ are selected. A set of the nearest codeword $2^{B_2}$ for $v_i$ may be defined by $T_i$ $\{n_{i,1}, n_{i,2}, \ldots, n_{i,2}B_2\}$.

The reason for selecting the most approximating codeword is that the real channel estimated at the receiving end is present at adjacent $v_i^*$ when the $v_i^*$ is selected at $C_1$. After $T_i$ is selected, the centroid between $v_i$ and $n_{i,j}$ is calculated. Since the chordal distance between $v_i$ and the centroid is equal to the chordal distance between $n_{i,j}$ and the centroid, the centroid may be considered as a boundary between $v_i$ and $n_{i,j}$.

In FIG. 4, the centroid between $v_1$ and a may be considered as the codeword regenerated in a region of $v_1$.

The important characteristics of the hierarchical codebook in accordance with the first embodiment of the present invention may reduce the complexity while having the performance similar to the conventional codebook. When the conventional codebook requires the calculation frequency of $2^B$, (B=B1+B2) and the hierarchical codebook in accordance with the first embodiment of the present invention requires only the frequency of $2^{B_1}+2^{B_2}$ for the really is estimated channel. For example, when $B_1=4$ and $B_2=2$, the codebook in accordance with the first embodiment of the present invention requires the comparison process 20 times in the channel and the conventional codebook requires the comparison process 64 times. This means that the calculation complexity may be reduced by about 70%. Despite the reduction in the calculation complexity, the performance of the MIMO system using the codebook in accordance with the first embodiment of the present invention exhibits the performance similar to the related art.

Further, the codebook in accordance with the first embodiment of the present invention may be referred to as a self-regenerative hierarchical codebook that generates the child codebook based on the chordal distance from the base codebook and the centroid condition.

Figure 5:
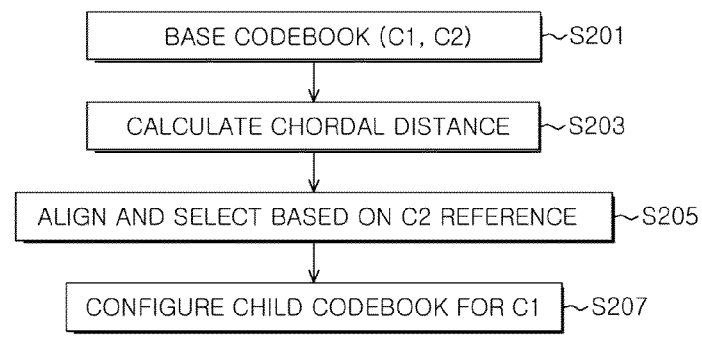
FIG. 5 is a flow chart for describing a method of generating a hierarchical codebook a second embodiment of the present invention.

FIG. 5 is a flow chart for describing the method of generating a hierarchical codebook in accordance with the second embodiment of the present invention and illustrates another example of the method of generating a hierarchical codebook for the i.i.d. channel.

The method of generating a codebook in accordance with the second embodiment of the present invention may be represented by a codebook mapping scheme. Compared with one generating the child codebook from the base codebook in which the hierarchical codebook in accordance with the first embodiment of the present invention is the Grassmannian codebook, the child codebook is is configured based on the two codebooks that are present in advance.

Referring to FIG. 5, the first base codebook $C_1=\{v_1, v_2, \ldots, v_2B_1\}$ and the second base codebook $C_2=\{c_1, c_2, \ldots, c_2B_2\}$ are first prepared (S201). In this case, $B_1<B_2$.

When the two base codebooks are prepared, the chordal distance between $V_i(1\leq i\leq 2^{B_1})$ and $c_j(1\leq j\leq 2^{B_2})$ is calculated for all the i and j (S203).

Thereafter, $v_i$ in which the chordal distance between $v_i$ and $c_j$ based on the second codebook $C_2$ is minimal is selected (S205). That is, $v_i$ in which $k_j=\mathrm{argmin}_{1\leq i\leq 2^{B_1}} d_c(v_i, c_j)$ is searched for all the j.

Where the child codebook for $v_i$ is defined by $S_i=\{j|i=k_j\}$ (S207).

In this case, if $S_i=\emptyset$ for $v_i$, $v_i$ may be used as the child codeword.

Figure 6:
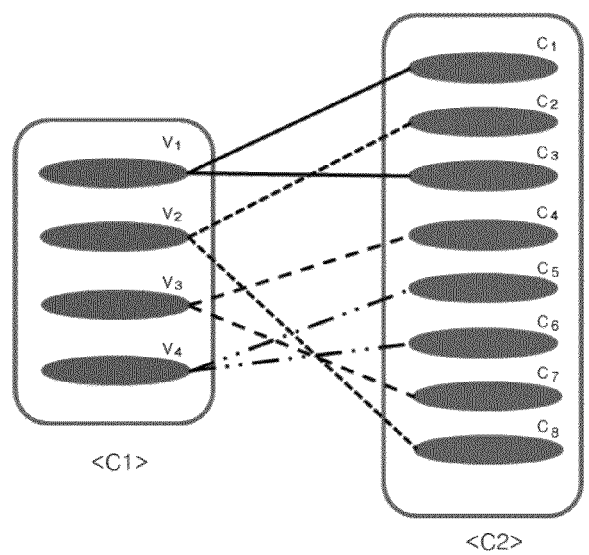
FIG. 6 is a conceptual diagram of the method of generating a hierarchical codebook the second embodiment of the present invention.

FIG. 6 is a conceptual diagram of the method for generating a hierarchical codebook in accordance with the second embodiment of the present invention.

FIG. 6 illustrates a codebook structure generated by the codebook mapping scheme when $B_1=2$ and $B_2=3$. The codebook mapping scheme that is the method for generating a codebook in accordance with the embodiment of the present invention has a two-stage codebook, wherein $B_2$ needs to be larger than $B_1$.

Referring to FIG. 6, it can be appreciated that the child is codeword of $v_1$ is determined as $c_1$ and $c_3$, the child codeword of $v_2$ is determined as $c_2$ and $c_8$, the child codeword of $v_3$ is determined as $c_4$ and $c_7$, and the child codeword of $v_4$ is determined as $c_5$ and $c_6$.

The receiving end estimates the real channel and then, selects the codeword having the minimum chordal distance for the channel in the first base codebook $C_1$, wherein the selected codeword is defined by $v_i^*$. Next, the optimal codeword related to $v_i^*$ is selected from $S_i$ by the codebook mapping scheme.

Unlike the related art considering all the codewords included in $C_2$, the method of generating a hierarchical codebook in accordance with the second embodiment of the present invention uses only the subset of the codeword within $C_1$ and the codeword within $C_2$ to remarkably reduce the calculation complexity. The method of generating a hierarchical codebook (the codebook mapping scheme) in accordance with the embodiment of the present invention is similar to tree structured vector quantization (TSVQ). However, there is a difference in that the method of generating a codebook in accordance with the second embodiment of the present invention obtains the mapping between the two codebooks that are present in advance, but the TSVQ structure configures the lower codebook from the upper codebook by the training symbol.

In summary, the most significant characteristic of the method of generating a codebook in accordance with the second embodiment of the present invention configures the child codebook by searching the nearest match between the two codebooks that are present in advance. For each $v_i \epsilon C_1$, the subset of the code words in $C_2$ approximating $v_i$ is obtained and the subset corresponds to the child codebook region of $v_i$. When $v_i^*$ is selected from $C_1$, it may be expected that the real channel is present approximating $v_i^*$. Therefore, the method of generating a codebook in accordance with the second embodiment of the present invention may be applied to the real system only when the two codebooks having different sizes that are present in advance are prepared.

Figure 7:
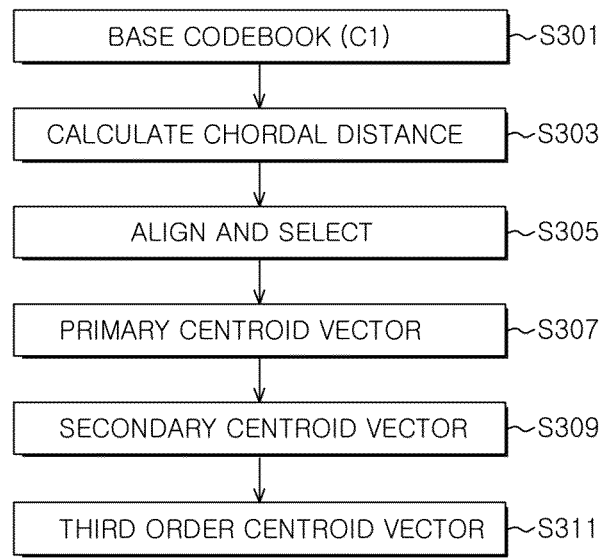
FIG. 7 is a flow chart for describing a method of generating a hierarchical codebook in accordance with a third embodiment of the present invention.

FIG. 7 is a flow chart for describing the method of generating a hierarchical codebook in accordance with a third embodiment of the present invention and illustrates an example of the method of generating a hierarchical codebook for the temporally correlated channel.

The channel state of the two consecutive time slots may be correlated by a correlation coefficient ρ in the temporally correlated channel. In the channel, the number of feedback bits may be reduced by using the channel correlation. A temporally correlated channel model is represented as follows.

$$H(t)=\rho H(t-1)+\sqrt{1-\rho^2}G(t) \qquad \text{[Equation 10]}$$

Where G(t) is the M×N matrix and each element thereof has normal distribution having the zero mean and unit distribution. $\rho_\rho$ is determined by an auto-correlation function of a Jake model as represented by Equation 11.

$$R(l)=J_0(2\pi f_D T_s l) \qquad \text{[Equation 11]}$$

Where $J_0(\bullet)$ is a first kind of a 0 order bezel function of type 1, $f_D$ is a Doppler shift, and $T_s$ is a sampling time. When l=1, $T_s$=5 ms, speed is 3 Km/h, and a carrier frequency is 2.5 GHz (WiMax), ρ=R(1)=0.9881.

The channel change between the previous time slot and the current time slot is small in the temporally correlated channel. Therefore, since the current channel may be expected to be in the channel of the previous time slot, the size of the codebook may be reduced. In the third embodiment of the present invention, the method of generating a hierarchical codebook is proposed based on the advantages of the temporally correlated channel characteristics.

First, the base codebook $C_1$ is prepared (S301). The base codebook ($C_1 = \{v_1, v_2, \ldots, v_2B_1\}$) may be the Grassmannian codebook and the size $2^{B_1}$, $v_i$ thereof are the i-th vector (or matrix) codeword.

When the base codebook is prepared, the chordal distance between $v_i$ and $v_j$ ($1 \leq i \leq 2^{B_1}$, $1 \leq j \leq 2^{B_1}$, $j \neq i$) is calculated for all the i-th and j-th vectors (or matrices) (S303).

Further, the chordal distance is aligned according to the size based on each codeword $v_i$ to select the designated number, for example, $2^{B_2}$ codewords having the close chordal distance from $v_i$ (S305). The selected $2^{B_2-1}$ codewords may be defined by $n_{i,k}$ ($1 \leq k \leq 2^{B_2-1}$). Further, $2^{B_1}$ is larger than $2^{B_2}$.

After $n_{i,k}$ is defined, the centroid vector between $v_i$ and $n_{i,k}$ is for all the i and k is calculated as the primary centroid vector, which is defined by $a_{i,k}$ (S307).

Next, for all the i and k, the centroid vector between $v_i$ and $a_{i,k}$ is calculated as the secondary centroid vector (S309), while the centroid vector between $n_{i,k}$ and $a_{i,k}$ is calculated as a third-order centroid vector (S311). At S309 and S311, the calculated secondary centroid vector and third-order centroid vector configures the new child codebook for $v_i$.

In the temporally correlated channel, the method of generating a hierarchical codebook is similar to the method of generating a codebook in accordance with the first embodiment of the present invention. However, there is a difference in that the scheme of designing a codebook in the temporally correlated channel obtains two centroids $b_{i,k,1}$ and $b_{i,k,2}$ for $v_i$ and $n_{i,k}$ and starts from the $2^{B_2-1}$ codewords instead of the $2^{B_2}$ codewords. $b_{i,k,1}$ is a codeword regenerated for a neighbor of $v_i$ and $b_{i,k,2}$ is a codeword regenerated for a neighbor of $n_{i,k}$. Both of the $b_{i,k,1}$ and $b_{i,k,2}$ are a portion of the child codebook for $v_i$.

Figure 8:
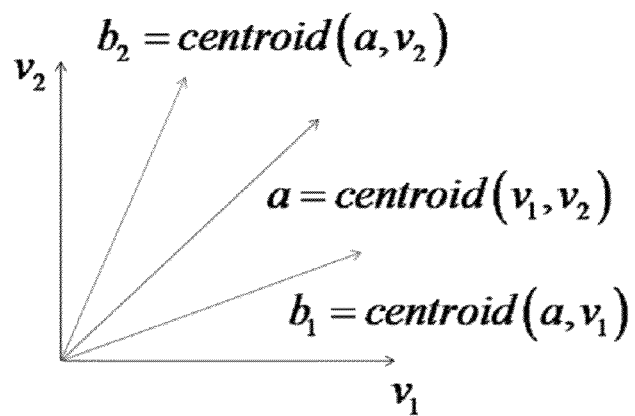
FIG. 8 is a conceptual diagram of the method of generating a hierarchical codebook in accordance with the third embodiment of the present invention.

FIG. 8 is ca conceptual diagram of the method of generating a hierarchical codebook in accordance with the third embodiment of the present invention.

Based on $v_1$, it is assumed that one of $2^{B_2-1}$ codewords selected at S305 is, for example, $v_2$. In this case, the primary centroid vector $a_{1,2}$ between $v_1$ and $v_2$ calculated by S107 is represented by a=centroid ($v_1$, $v_2$) in FIG. 4.

Thereafter, the secondary centroid vector between $v_1$ and $a_{1,2}$ (=centroid ($v_1$, $v_2$)) calculated at S309 is represented by $b_{i,k,1} = b_1$ = centroid (a, $v_1$) and the third-order centroid vector between $v_2$ and $a_{1,2}$ (=centroid ($v_1$, $v_2$)) calculated at S311 is represented by $b_{i,k,2} = b_2$ = centroid (a, $v_2$).

That is, it can be appreciated that two child codewords ($b_{i,k,1}$, $b_{i,k,2}$) are generated from two neighbor codewords $v_1$ and $v_2$. In the codebook design in accordance with the embodiment of the present invention, the codebook is configured by the two-stage codebook similar to the hierarchical codebook in accordance with another embodiment of the present invention. Further, the $2^{B_2-1}$ codewords belong to the region of $v_i$ and the remaining $2^{B_2-1}$ codewords belong to the region of $n_{i,k}$ ($1 \leq k \leq 2^{B_2-1}$).

In real system, the optimal codeword at the first time slot is selected from $C_1$, which is defined by $v_i^*$. The optimal codeword is selected from the child codebook for $v_i^*$ instead of the base codebook $C_1$ from the second time slot to the refresh time slot. It is to be noted that there are two portions within the child codebook for each base codeword. The child codebook at the next slot is determined by is the optimal codeword at the current time slot. For example, the case in which $B_1=3$ and $B_2=2$ and two codewords $v_5$ and $v_8$ approximates $v_1$ is considered. When $b_{1,8,1}$ is selected from the child codebook for $v_1$ at time slot t−1, the real channel may be predicted to be within the region of $v_1$ and thus, the optimal codeword may be selected from the child codebook for $v_1$ at next time slot t.

However, when $b_{1,8,2}$ is selected from the child codebook for $v_1$ at time slot t−1, the real channel may be predicted to be within the region of $v_8$ and thus, the optimal codeword may be selected from the child codebook for $v_8$ at next time slot t.

FIGS. 9 to 12 are diagrams for describing the performance of the MIMO system using the hierarchical codebook in accordance with the embodiment of the present invention.

Figure 9:
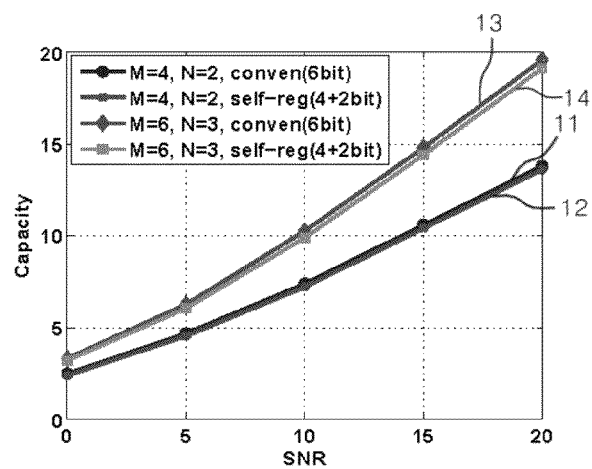
FIGS. 9 to 12 are diagrams for describing performance of an MIMO system using the hierarchical codebook in accordance with the embodiment of the present invention.

First, FIG. 9 is a graph acquired by comparing the performance of cases 11 and 13 of the codebook for i.i.d. in accordance with the related art and cases 12 and 14 of using the codebook in accordance with the Invention.

Graphs 11 and 12 illustrate the performance comparison when the number M of transmit antennas is 4 and the number N of receive antennas is 2. Meanwhile, in the case 11 of the related art, the bit number of feedback information is $2^{(4+2)} = 64$ bits, while in the case 12 of using the Invention, the information of $2^4+2^2$ bits is feedback.

It can be appreciated from FIG. 9 that the complexity is reduced to about 70% while maintaining the similar system performance.

Figure 10:
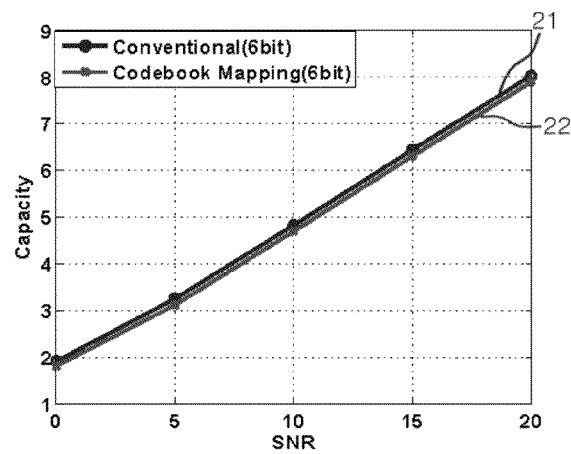

FIG. 10 illustrates the performance comparison between the codebook (graph 21) in accordance with the related art and the codebook (graph 22) in accordance with the second embodiment of the Invention in the i.i.d. channel when M=4, N=1, $B_1=3$, and $B_2=6$.

In accordance with the second embodiment of the present invention, the initial two codebooks for the codebook mapping are 3-bit and 6-bit codebooks. Four codewords within the 3-bit codebook are associated with 9 codewords within the 6-bit codebook. Further, another four codewords within the 3-bit codebook are associated with 7 codewords within the 6-bit codebook. The codebook mapping scheme requires the comparison process of a maximum of 8+9=17 times in the real channel, unlike performing the comparison process 64 times. As such, the codebook mapping scheme compares with the codebook scheme in accordance with the related art to have the low complexity while the capacity performance thereof is similar to each other.

Figure 11:
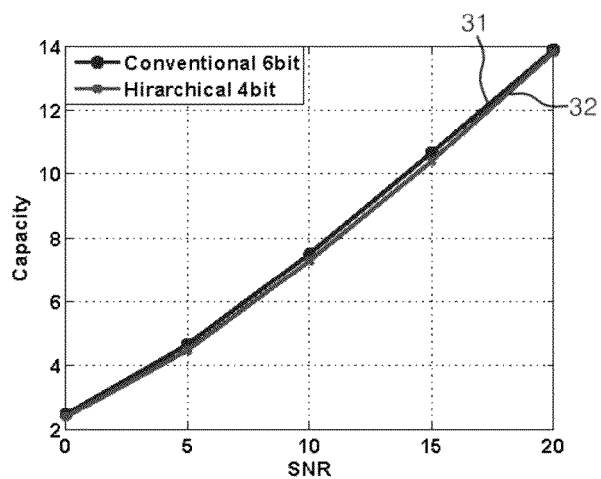

FIG. 11 illustrates the performance comparison between a hierarchical codebook (graph 31) in accordance with the related art and a hierarchical codebook (graph 32) in accordance with a third embodiment of the present invention when M=4, N=2, $B_1=6$, $B_2=4$, v=8 Km/h ($B_2$ is the number of feedback bits in the temporally correlated channel).

In FIG. 11, ρ is set to be 0.9172 to correspond to mobility in a WiMAx standard (8 km/h running speed). It is assumed that the channel sampling period is 5 ms and the codebook refresh period is 100 ms. In order to prevent potential errors, it is to be noted that the 6 bit ($B_1$) base code is used instead of the 4 bit ($B_2$) child codebook for every refresh period. In the temporally correlated channel, it can be observed that the 4-bit codebook has capacity similar to the 6-bit codebook in accordance with the related art.

Figure 12:
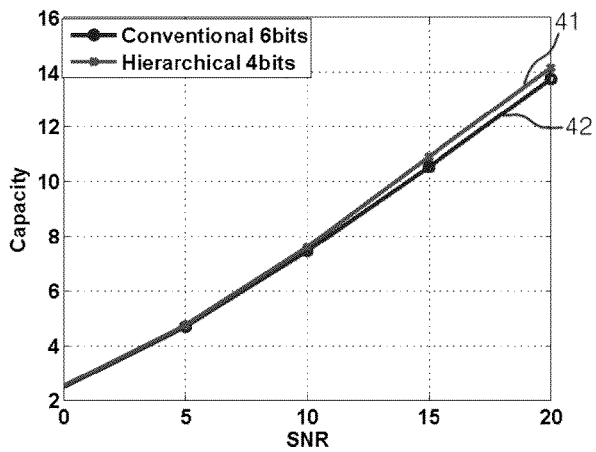

FIG. 12 illustrates the performance comparison between the codebook in accordance with the related art and the codebook in accordance with the third embodiment of the present invention in the temporally correlated channel when M=4, N=2, $B_1=6$, $B_2=4$, v=3 Km/h. In this case, it can be appreciated that the codebook (graph 41) in accordance with the third embodiment of the present invention has higher performance than that of the codebook (graph 42) in accordance with the related art. The reason is that the total number (approximately 10 bits) of codewords in the hierarchical codebook in accordance with the third embodiment of the present invention is larger than the codebook (4 bits) in accordance with the related art. It can be appreciated that the higher quantization of the hierarchical codebook in accordance with the third embodiment of the present invention may be more efficient when the mobility is low.

As described above, the present invention proposes the is method for generating a hierarchical codebook capable of lowering the calculation complexity while minimizing the performance loss for the i.i.d. channel and the temporally correlated channel. The important matters of the present invention are that the child codebook is designed based on the centroid condition depending on the chordal distance. Further, for each codeword of the base codebook, the child codebook is defined by the chordal distance and the centroid conditions.

As can be appreciated from FIGS. 9 to 12, the complexity can be lowered while having the similar performance to the codebook in accordance with the related art, which may be usefully used for the wireless standard using the limited feedback scheme in the future.

While certain embodiments have been described above, it will be understood to those skilled in the art that the embodiments described are by way of example only. Accordingly, the device and method described herein should not be limited based on the described embodiments. Rather, the apparatus described herein should only be limited in light of the claims that follow when taken in conjunction with the above description and accompanying drawings.

What is claimed is:

1. A multiple-input multiple-output (MIMO) system including a transmitting end and a receiving end, wherein a channel between the transmitting end and the receiving end is a temporally correlated channel, wherein the transmitting end includes:
    a hierarchical codebook in which at least one base codebook comprising a plurality of reference codewords is designated as an upper matrix and a child codebook comprising a first child codebook and a second child codebook is designated as a lower matrix;
    a scheduler configured to receive channel state information from the receiving end and select precoding matrices from the hierarchical codebook based on the channel state information; and
    a precoder configured to apply the precoding matrices selected in the scheduler to data to be transmitted to the receiving end and transmit the selected precoding matrices through a plurality of antennas,
    wherein, a predetermined number of reference codewords are selected based on a chordal distance between the selected any one reference codeword and other reference codewords, and the predetermined number of reference codewords are set as candidate codewords, and the candidate codewords are configured to be selected with respect to each of the reference codewords, and
    wherein the first child codebook is configured to belong to region of the selected any one reference codeword, and the second child codebook is configured to belong to each region of the candidate codewords, and
    wherein the first child codebook is configured to comprise at least one codeword selected based on centroid conditions between the selected any one reference codeword and each of primary centroid vectors, wherein each of the primary centroid vectors is calculated based on the centroid conditions between the selected any one reference codeword and each of the candidate codewords; and
    the second child codebook is configured to comprise at least one codeword selected based on the centroid conditions between each of candidate codewords and each of the primary centroid vectors.

2. The MIMO system of claim 1, wherein the base codebook is a Grassmannian codebook.

3. The MIMO system of claim 1, wherein a size of the base codebook is $2^{B}1$, and the candidate codewords of $2^{B}2-1$ number are selected,
    wherein the B1 is a number of bits for channel state information feedbacking from the receiving to transmitting for the base codebook, and the B2 is a number of bits for channel state information feedbacking from the receiving to transmitting for the child codebook, and the sum of the B1 and B2 is a total number of bits for channel state information feedbacking from the receiving to transmitting.

4. A multiple-input multiple-output (MIMO) system including a transmitting end and a receiving end, wherein a channel between the transmitting end and the receiving end is a temporally correlated channel, wherein the receiving end includes:
    a hierarchical codebook in which at least one base codebook comprising a plurality of reference codewords is designated as an upper matrix and a child codebook comprising a first child codebook and a second child codebook is designated as a lower matrix;
    a channel estimator configured to estimate a channel from signals received from the transmitting end through a plurality of antennas;
    a precoding selector configured to select precoding matrices based on channel information estimated in the channel estimator and feedbacking indexes corresponding thereto as channel state information to the transmitting end; and
    a demodulator configured to detect and demodulate data received through the plurality of antennas by using the channel information estimated in the channel estimator and the precoding matrices selected in the precoding selector,
    wherein, a predetermined number of reference codewords are selected based on a chordal distance between the selected any one reference codeword and other reference codewords, and the predetermined number of reference codewords are set as candidate codewords, and the candidate codewords are configured to be selected with respect to each of the reference codewords, and
    wherein the first child codebook is configured to belong to region of the selected any one reference codeword, and the second child codebook is configured to belong to each region of the candidate codewords, and
    wherein the first child codebook is configured to comprise at least one codeword selected based on centroid conditions between the selected any one reference codeword and each of primary centroid vectors, wherein each of the primary centroid vectors is calculated based on the centroid conditions between the selected any one reference codeword and each of the candidate codewords; and
    the second child codebook is configured to comprise at least one codeword selected based on the centroid conditions between each of candidate codewords and each of the primary centroid vectors.

5. The MIMO system of claim 4, wherein the base codebook is a Grassmannian codebook.

6. The MIMO system of claim 4, wherein the precoding selector is configured to select an upper codeword and a lower codeword at a previous time slot,
  wherein the upper codeword is selected within the plurality of reference codewords included in the base codebook and the lower codeword is selected within a child codebook set corresponding to the upper codeword,
  wherein the precoding selector is configured to select a lower codeword within a child codebook set corresponding to a reference codeword of region belonged to the lower codeword selected at the previous time slot, from next time slot before a codebook refresh period arrives, and
  wherein a reference codeword selected at the next time slot and a reference codeword selected at the previously time slot are configured to be same or different.

7. The MIMO system of claim 4, wherein a size of the base codebook is $2^{B}1$, and the candidate codewords of $2^{B}2-1$ number are selected,
  wherein the B1 is a number of bits for channel state information feedbacking from the receiving to transmitting for the base codebook, and the B2 is a number of bits for channel state information feedbacking from the receiving to transmitting for the child codebook, and the sum of the B1 and B2 is a total number of bits for channel state information feedbacking from the receiving to transmitting.

8. The MIMO system of claim 6, wherein the precoding selector selects a lower codeword within a child codebook of region belonged to the upper codeword at the next time slot when the lower codeword selected at the previously time slot is belonged to a first child codebook,
  and selects a lower codeword within a child codebook set correspond to a region of a candidate codewords belonging to the lower codeword at the next time slot when the lower codeword selected in the previously time slot is belonged to a second child codebook.

9. A method for generating a hierarchical codebook for a multiple-input multiple-output (MIMO) system including a transmitting end and a receiving end, wherein a channel between the transmitting end and the receiving end is a temporally correlated channel, the method comprising:
  setting at least one base codebook comprising a plurality of reference codewords as an upper matrix;
  calculating a chordal distance between selected any one reference codeword and other reference codewords, with respect to each reference codeword;
  selecting candidate codewords by selecting a designated number of reference codewords from the plurality of reference codewords based on the chordal distance; and
  setting a child codebook including a first child codebook belonging to region of the selected any one reference codeword, and a second child codebook belonging to each region of the candidate codewords and setting the child codebook as a lower matrix,
  wherein the selecting of candidate codewords includes:
  selecting the designated number of candidate codewords having a close chordal distance; and
  the setting of the child codebook includes:
    calculating each of primary centroid vectors between the selected any one reference codeword and each of the candidate codewords;
    calculating each of secondary centroid vectors between the selected any one reference codeword and each of the primary centroid vectors;
    calculating each of third order centroid vectors between the candidate codewords and each of the primary centroid vectors;
  setting each of the secondary centroid vectors as the codewords of the first child codebook and each of the third order centroid vectors as the codeword of the second child codebook.

10. The method of claim 9, wherein the base codebook is a Grassmannian codebook.

11. The method of claim 9, wherein a size of the base codebook is $2^{B}1$, and the candidate codewords of $2^{B}2-1$ number are selected,
  wherein the B1 is a number of bits for channel state information feedbacking from the receiving to transmitting for the base codebook, and the B2 is a number of bits for channel state information feedbacking from the receiving to transmitting for the child codebook, and the sum of the B1 and B2 is a total number of bits for channel state information feedbacking from the receiving to transmitting.

* * * * *